(12) United States Patent
Jaspers

(10) Patent No.: US 6,263,102 B1
(45) Date of Patent: *Jul. 17, 2001

(54) COLOR AND CONTOUR SIGNAL GENERATION

(75) Inventor: Cornelis A. M. Jaspers, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,892

(22) Filed: Jul. 15, 1998

(30) Foreign Application Priority Data

Jul. 15, 1997 (EP) .................................. 97401699

(51) Int. Cl.$^7$ ................................ G06K 9/00; G06K 9/40
(52) U.S. Cl. ........................................... 382/162; 382/260
(58) Field of Search ..................... 358/518, 512, 358/514, 431, 505, 509, 511; 348/339, 240, 242; 382/162, 165, 260, 266

(56) References Cited

U.S. PATENT DOCUMENTS

| | | | |
|---|---|---|---|
| 4,945,406 | * | 7/1990 | Cok ........................................ 358/80 |
| 5,019,895 | * | 5/1991 | Yamamoto ............................. 358/36 |
| 5,333,055 | * | 7/1994 | Murata ................................... 348/239 |
| 5,612,794 | * | 3/1997 | Brandestini ........................... 358/505 |
| 5,614,947 | * | 3/1997 | Tanizoe ................................ 348/241 |

* cited by examiner

*Primary Examiner*—Cheukfan Lee
(74) *Attorney, Agent, or Firm*—Edward W. Goodman

(57) ABSTRACT

In a method of generating output color signals (Ro, Go, Bo) and determining a contour signal (cont) from a sensor signal (RGBin) obtained by a sensor having a color filter with alternately colored filter elements, the sensor signal (RGBin) is delayed (1H) over at least one row period; for each color, zero values are inserted at locations corresponding to the locations of differently colored filter elements; a plurality of mutually at least one row-delayed color signals (nxG, nxR, nxB) with inserted zeros is furnished; the plurality of mutually at least one row-delayed color signals (nxG, nxR, nxB) with inserted zeros is filtered (FR, FG, FB) to obtain the output color signals (Ro, Go, Bo), and the plurality of mutually at least one row-delayed color signals (nxG, nxR, nxB) with inserted zeros is filtered (Fcont) to obtain the contour signal (cont).

3 Claims, 3 Drawing Sheets

COLOR AND CONTOUR SIGNAL GENERATION

BACKGROUND OF THE INVENTION

The invention relates to a method of and a device for generating color and contour signals and to a camera comprising such a device.

SUMMARY OF THE INVENTION

It is, inter alia, an object of the invention to provide an economical color and contour signal generation. To this end, first and second aspects of the invention provide a method of and a device for generating output color signals and determining a contour signal from a sensor signal obtained by a sensor having a color filter with alternately colored filter elements. A third aspect of the invention provides a camera comprising a sensor having a color filter with alternately colored filter elements for generating a sensor signal, and the device as indicted above.

In accordance with a primary aspect of the present invention, a method of generating output color signals and determining a contour signal from a sensor signal obtained by a sensor having a color filter with alternately colored filter elements comprises the following steps: the sensor signal is delayed over at least one row (line) period; for each color, zero values are inserted at locations corresponding to the locations of differently colored filter elements; a plurality of mutually at least one row (line)-delayed color signals with inserted zeros is furnished; the plurality of mutually at least one row (line)-delayed color signals with inserted zeros is filtered to obtain the output color signals, and the plurality of mutually at least one row (line)-delayed color signals with inserted zeros is filtered to obtain the contour signal.

The invention yields the advantage that the row (line) memories which are used for color signal generation are also used for generating the contour signal, thus providing a very economical solution.

These and other aspects of the invention will be apparent from and elucidated with reference to the embodiments described hereinafter.

DESCRIPTION OF THE PREFERRED EMBODIMENTS

Figure 1:
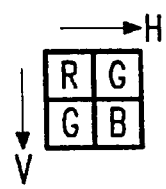
FIG. 1 shows an example of an RGB Bayer filter.
Figure 2:
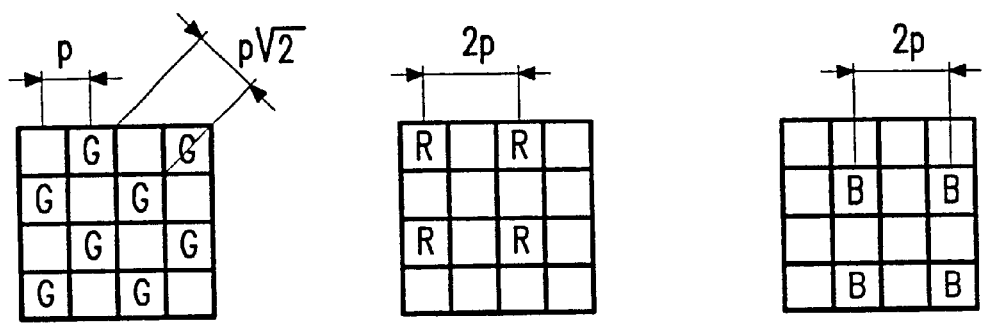
FIG. 2 shows the sample structure of the RGB pixels and the pitch of the GRB colors in the RGB Bayer filter of FIG. 1.

An overview of the Red-Green-Blue (RGB) or Yellow-Green-Cyan (YGC) Bayer color array and its Nyquist domain will be given in a nutshell. FIG. 1 shows an example of an RGB Bayer filter. H indicates the columns, V indicates the rows. FIG. 2 shows the sample structure of the RGB pixels and the pitch of the GRB colors in the RGB Bayer filter of FIG. 1. The pitch p is the distance between two neighboring pixels having the same color. Its inverse value represents the pixel or system clock frequency in the case of a single RGB output of the sensor, i.e., fs=1/p. The sample frequency of each RGB color is inversely proportional to the shortest distance between the pixels of each RGB color, i.e. a horizontal and vertical sample frequency of ½p=fs/2 for the Red and Blue colors, and a diagonal sample frequency of $1/p\sqrt{2}=fs/\sqrt{2}$ for Green.

Figure 3:
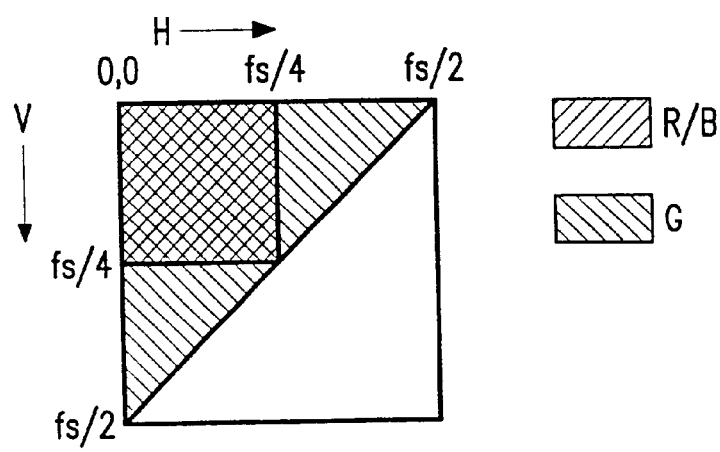
FIG. 3 shows the theoretically assumed Nyquist domain of the RGB filter array.

FIG. 3 shows the theoretically assumed Nyquist domain of the RGB filter array. R/B indicates the red/blue domain, while G indicates the green domain. H indicates horizontal resolution and V indicates vertical resolution. The full square corresponds to the domain of a 3 CCD camera. In practice, the Green signal offers less resolution than is suggested by the theoretical Nyquist theorem. Near fs/2, there is much signal distortion. The distortion near fs/2 in the horizontal and vertical directions does not allow much amplification by the contour filter near these frequencies, as otherwise, the distortion will further increase. The distortion near fs/2 is such that a distinction of a direction is not possible.

By means of parallel processing of the available and missing Green pixels, the contour gain near fs/2 can be minimized as much as possible as a function of the number of coefficients. For general-purpose filter design, an array of 7×5 (7 horizontally, 5 vertically) coefficients has been applied, always using the same delay for the center pixel. In a practical situation, the number of coefficients can of course be limited to the dimensions required by the largest filter type. Some examples of filter coefficients for parallel processing are shown. For a unity signal amplitude, the result of the filters is divided by the sigmaX value. Coefficient [34] represents the center pixel.

The filter coefficients for the reconstruction of the RGB signals are as follows.
For Green
wG[23]=0; wG[24]=1; wG[25]=0;
wG[33]=1; wG[34]=4; wG[35]=1;
wG[43]=0; wG[44]=1; wG[45]=0;
sigmawG=4.
For Red and Blue
wRB[23]=1; wRB[24]=2; wRB[25]=1;
wRB[33]=2; wRB[34]=4; wRB[35]=2;
wRB[43]=1; wRB[44]=2; wRB[45]=1;
sigmawRB=4.

Although some possible contour filter coefficients are mentioned, many variations of these coefficients are of course also possible.
For a 5×3 (HxV) filter
wc[22]=−2; wc[23]=−1; wc[24]=2; wc[25]=−1; wc[26]=−2;
wc[32]=−2; wc[33]=2; wc[34]=8; wc[35]=2; wc[36]=−2;
wc[42]=−2; wc[43]=−1; wc[44]=2; wc[45]=−1; wc[46]=−2;
sigmawCR=8.
For an alternative 5×3 (HxV) filter with less gain near fs/2
wc[22]=−1; wc[23]=0; wc[24]=1; wc[25]=0; wc[26]=−1;
wc[32]=−2; wc[33]=1; wc[34]=4; wc[35]=1; wc[36]=−2;
wc[42]=−1; wc[43]=0; wc[44]=1; wc[45]=0; wc[46]=−1;
sigmawCR=4.
For a 7×3 (HxV) filter
wc[21]=0; wc[22]=−1; wc[23]=−1; wc[24]=2; wc[25]=−1;
 wc[26]=−1; wc[27]=0;
wc[31]=−2; wc[32]=−2; wc[33]=2; wc[34]=8; wc[35]=2;
 wc[36]=−2; wc[37]=−2;

wc[41]=0; wc[42]=−1; wc[43]=−1; wc[44]=2; wc[45]=−1; wc[46]=−1; wc[47]=0;
sigmawCR=8.

Also for such a 7×3 (H×V) filter, a version with less gain near fs/2 is possible
wc[21]=−1; wc[22]=−1; wc[23]=0; wc[24]=2; wc[25]=0; wc[26]=−1; wc[27]=−1;
wc[31]=−2; wc[32]=−2; wc[33]=2; wc[34]=8; wc[35]=2; wc[36]=−2; wc[37]=−2;
wc[41]=−1; wc[42]=−1; wc[43]=0; wc[44]=2; wc[45]=0; wc[46]=−1; wc[47]=−1;
sigmawCR=8.

A simple way to avoid much gain near fs/2 is to make the negative coefficients surrounding the center pixel zero. So, wc[23]=0, wc[25]=0 and wc[43]=0, wc[45]=0. However, this must be done in such a manner that the sigmawCR value is suitable for missing Green as well as for Green center pixels, that are present.
For a 5×5 filter
wc[12]=0; wc[13]=−1; wc[14]=−1; wc[15]=−1; wc[16]=0;
wc[22]=−1; wc[23]=−1; wc[24]=2; wc[25]=−1; wc[26]=−1;
wc[32]=−1; wc[33]=2; wc[34]=8; wc[35]=2; wc[36]=−1;
wc[42]=−1; wc[43]=−1; wc[44]=2; wc[45]=−1; wc[46]=−1;
wc[52]=0; wc[53]=−1; wc[54]=−1; wc[55]=−1; wc[56]=0;
sigmawCR=8.
For another 5×5 filter
wc[12]=0; wc[13]=−1; wc[14]=−2; wc[15]=−1; wc[16]=0;
wc[22]=−1; wc[23]=0; wc[24]=2; wc[25]=0; wc[26]=−1;
wc[32]=−2; wc[33]=2; wc[34]=8; wc[35]=2; wc[36]=−2;
wc[42]=−1; wc[43]=0; wc[44]=2; wc[45]=0; wc[46]=−1;
wc[52]=0; wc[53]=−1; wc[54]=−2; wc[55]=−1; wc[56]=0;
sigmawCR=8.
For a 7×5 filter
wc[11]=−2; wc[12]=−3; wc[13]=−2; wc[14]=−3; wc[15]=−2; wc[16]=−3; wc[17]=−2;
wc[21]=0; wc[22]=−2; wc[23]=0; wc[24]=6; wc[25]=0; wc[26]=−2; wc[27]=0;
wc[31]=0; wc[32]=−3; wc[33]=6; wc[34]=24; wc[35]=6; wc[36]=−3; wc[37]=0;
wc[41]=0; wc[42]=−2; wc[43]=0; wc[44]=6; wc[45]=0; wc[46]=−2; wc[47]=0;
wc[51]=−2; wc[52]=−3; wc[53]=−2; wc[54]=−3; wc[55]=−2; wc[56]=−3; wc[57]=−2;
sigmawCR=24.

It is important to realize that the parallel processing method using these types of filters requires a zero to be filled in the R, G and B signals at that location where the sensor does not offer R, G or B signals. See the zero switch box in the embodiment of FIG. 6.

For the Red (or Blue) signals, zeros are thus inserted as follows
RORORO
OOOOOO
RORORO, etc.,
while for green and for the contour signals, zeros are inserted as follows
OGOGOG
GOGOGO, etc.

Figure 4:
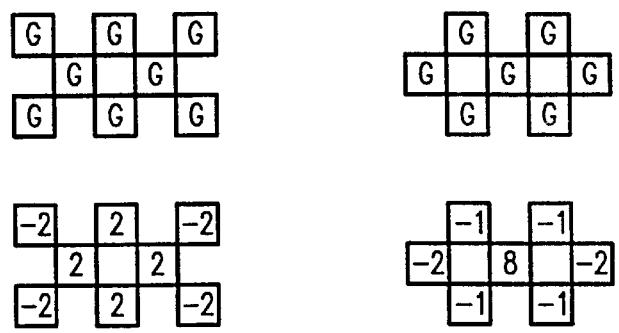
FIG. 4 shows an example of how the filter coefficients relate to the green pixels, inclusive of the zeros, for a 5×3 contour signal.

FIG. 4 shows an example of how the filter coefficients relate to the green pixels, inclusive of the zeros, for a 5×3 contour signal. The left and right upper pictures show the green samples with the zeros, while the left and right lower pictures indicate the filter coefficients.

Figure 5:
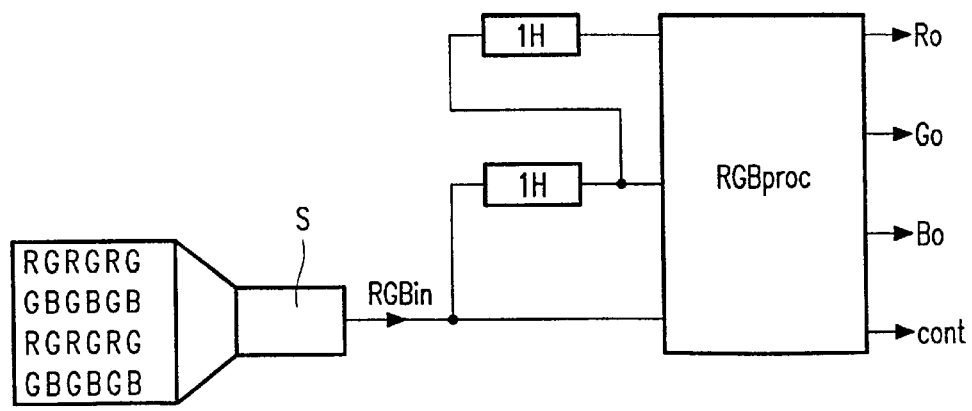
FIG. 5 shows an embodiment of a camera comprising a sensor and a processor for carrying out the parallel 2D Laplacian contour and RGB signal processing for an RGB Bayer sensor.

FIG. 5 shows an embodiment of a camera comprising a sensor and a processor for carrying out the parallel 2D Laplacian contour and RGB signal processing for an RGB Bayer sensor S. The RGB input signal RGBin from the sensor S with the RGB Bayer color filter of FIG. 1 is applied directly, and thru a first and a second horizontal row delay (1H) to inputs of an RGB and parallel contour processor RGBproc which furnishes the RGB output signals Ro, Go and Bo, as well as a contour signal cont.

For this processing method, only two horizontal row delays (1H) are needed. If a 2D Laplacian contour filter were located after the RGB reconstruction, a total of 4 row delays would be needed. Because of the distortion near fs/2, such a contour filter after the RGB reconstruction will not have a better performance than the parallel contour processing in FIG. 5.

Figure 6:
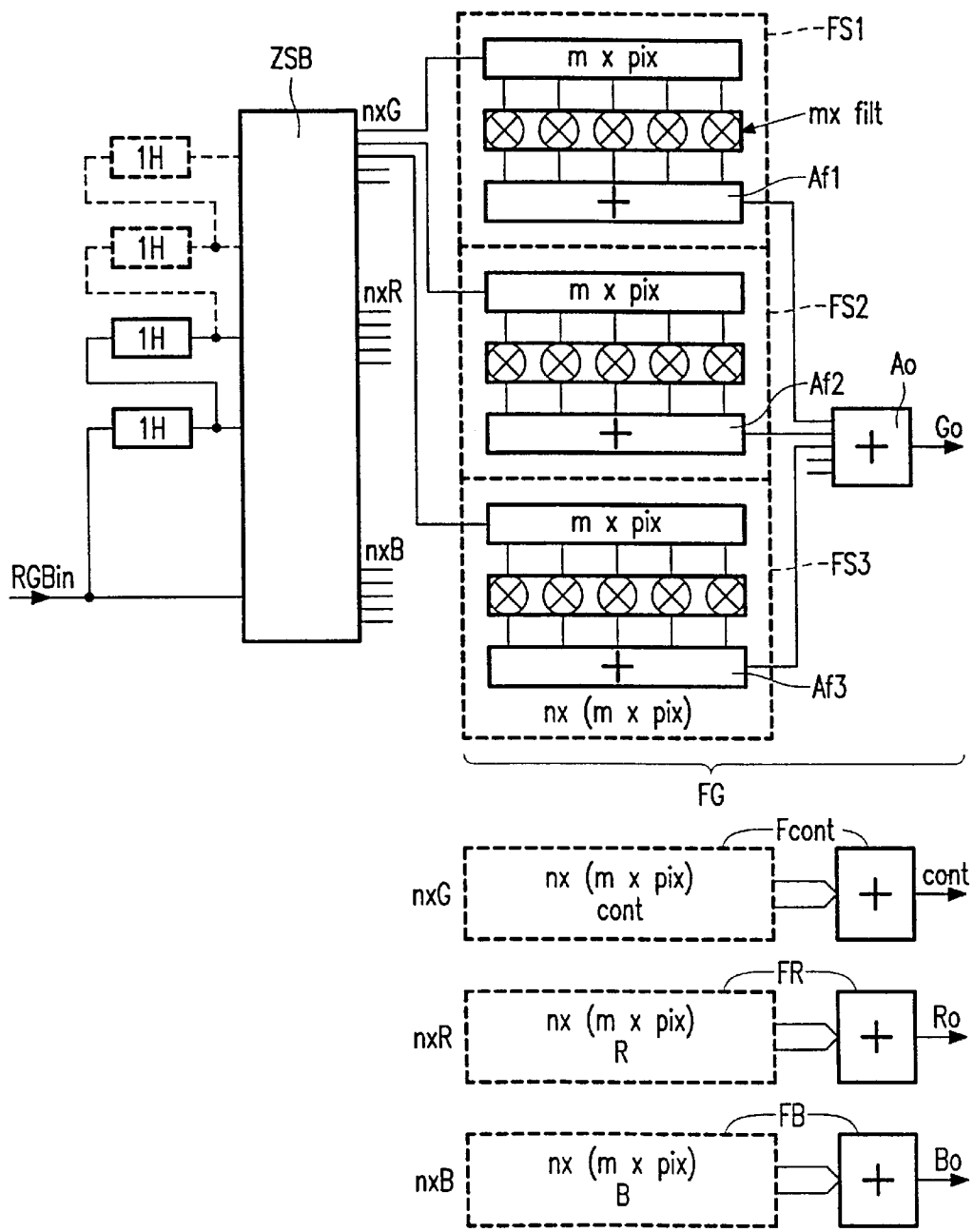
FIG. 6 shows more details of the parallel RGB and contour processing of FIG. 5.

FIG. 6 shows more details of the parallel RGB and contour processing of FIG. 5. It shows the zero switch box ZSB for the RGB signals in order to be able to apply 2D laplacian RGB and contour filters. It is assumed that m row delays and n pixel delays are available for each of the output signals (Go, cont, Ro, Bo) to be generated. However, it has become apparent from the previously mentioned RGB reconstruction filters that a 3×3 row and pixel delay is sufficient. The choice of the contour filter Fcont thus determines the numbers of m and n. The RGB input signal and n−1 row-delayed versions thereof are applied to a zero switch box ZSB for inserting, in each of its output signals, zeros at the positions where the color filter on the image sensor has colors different from the respective output signal. For each color (G, R, B), the zero switch box ZSB has as many output lines (n) as inputs. The green output lines of the zero switch box ZSB are used both for generating the green output signal Go (by means of a green color filter FG) and the contour signal cont (by means of the contour filter Fcont). In the green color filter FG, each output line of the zero switch box ZSB is applied to a filter section FS1 (FS2, FS3) having m pixel delays (m×pix), m multipliers coupled to the respective outputs of the m pixel delays for multiplication by m respective filter weights (m×filt), and an adder Af1 (Af2, Af3) for summing the outputs of the m multipliers. An output adder Ao sums the outputs of the n filter section adders Af1, Af2, Af3, . . . Similar filters Fcont, FR and FB, each having n filter sections, are present to generate the contour signal cont, the red output signal Ro and the blue output signal Bo, respectively.

A primary aspect of the invention can be summarized as follows. Single sensor digital still color cameras with an RGB Bayer color filter array can be equipped with a one or two-dimensional (1D, 2D) contour filter which is acting parallel to the RGB color reconstruction, i.e., directly on the available and missing Green pixels which are offered by the sensor. The advantage of this method is that contour processing after the reconstruction of the RGB signals has become superfluous. Especially if a subsequent 2D contour processing is planned, this will save chip area because no extra row delays are needed. A preferred embodiment shows the following advantageous features. The zero switch box which makes Laplacian filtering of the RGB and contour signals possible. The parallel contour processing with the original sensor Green data. This saves row delays in comparison with a design in which the two-dimensional contour processing is arranged after the RGB reconstruction. The basic organization of the contour filter coefficients as illustrated in FIG. 4. The contour filter coefficients or varieties of them.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. In the device claim enumerating several means, several of these means can be embodied by one and the same item of hardware.

What is claimed is:

1. A method of generating output color signals and determining a contour signal from a sensor signal obtained by a sensor having an optical color filter with alternately colored filter elements, said method comprising the steps:

delaying said sensor signal over at least one row period;

deriving separate color signals with inserted zeros from said sensor signal, including, for each color, the steps of inserting zero values at locations corresponding to the locations of differently colored filter elements, and furnishing a plurality of mutually at least one-row-delayed color signals with inserted zeros;

first filtering said plurality of mutually at least one-row-delayed color signals with inserted zeros to obtain said output color signals; and second filtering said plurality of mutually at least one-row-delayed color signals with inserted zeros in parallel with said first filtering step to obtain said contour signal.

2. A device for generating output color signals and determining a contour signal from a sensor signal obtained by a sensor having an optical color filter with alternately colored filter elements, said device comprising:

means for delaying said sensor signal over at least one row period;

means for deriving separate color signals with inserted zeros from said sensor signal, including, for each color, means for inserting zero values at locations corresponding to the locations of differently colored filter elements, and means for furnishing a plurality of mutually at least one-row-delayed color signals with inserted zeros;

first means for filtering said plurality of mutually at least one-row-delayed color signals with inserted zeros to obtain said output color signals; and second means for filtering said plurality of mutually at least one-row-delayed color signals with inserted zeros in parallel with said first filtering means to obtain said contour signal.

3. A camera comprising:

a sensor having a color filter with alternately colored filter elements for generating a sensor signal; and a device for generating output color signals and determining a contour signal as claimed in claim 2.

* * * * *